United States Patent Office 2,837,492
Patented June 3, 1958

2,837,492
PROCESS OF MAKING COLORLESS AQUEOUS SALINE SOLUTIONS OF POLYACRYLONITRILE

George W. Stanton, Walnut Creek, Clyde W. Davis, Antioch, and Thomas C. Spence, Concord, Calif., assignors to The Dow Chemical Company, Midland, Mich., a corporation of Delaware No Drawing. Application February 10, 1954
Serial No. 409,526

9 Claims. (Cl. 260—29.6)

This invention relates to colorless solutions of polymers rich in acrylonitrile, in aqueous saline media. It relates in particular to colorless solutions of polyacrylonitrile in aqueous zinc halide-containing solutions, and to a method for rendering such saline solutions colorless.

It is known that polyacrylonitrile and copolymers of acrylonitrile can be dissolved in concentrated aqueous solutions of highly hydrated metal salts, and that the saline solutions of such polymeric materials can be used as spinning dopes for the preparation of useful fibers. Chief among the salts used to dissolve such polymers is zinc chloride, which may be used as the sole saline constituent of the aqueous solution or may be used in admixture with lesser amounts of such other salts as calcium or magnesium chlorides, as disclosed by two of the present inventors and another in U. S. Patents Nos. 2,648,646 and 2,648,647.

Solutions of acrylonitrile-containing polymers in aqueous salts containing zinc chloride as the principal saline constituent develop a characteristic yellow, amber or even a brown discoloration when made from the commercially available grades of zinc chloride, including those sold as "chemically pure." These colors are carried over to fibers spun from such solutions, and the discolored fibers are deemed unacceptable for making quality textile goods. Methods are available for purifying the commercial zinc chloride so as to minimize its tendency to form discolored solutions of the polymers. One such method is disclosed in the copending application of one of the present inventors, Serial No. 300,767, filed July 24, 1952, now Patent No. 2,746,840. It has been found that, unless treated in accordance with this invention, even the purified zinc chloride gives colored solutions of the polymer. It would be desirable to be able to produce substantially colorless solutions of acrylonitrile-containing polymers in aqueous saline media containing zinc chloride and that is the principal object of this invention.

The stated desired end is attained, according to the present invention, by acidifying the saline solution containing a zinc halide until the pH is below that of the zinc halide alone at the concentration employed. Specifically, the zinc halide-containing solution is treated with enough of a non-oxidizing acid, to reduce its pH to 4 or lower. The acid employed should be one which forms only soluble salts with the cations in the solution, i. e., it should form no precipitate. The preferred inorganic acids are phosphoric acid and the hydrogen halides, specifically hydrochloric acid, and the useful organic acids include the monocarboxylic acids of from 1 to 4 carbon atoms, although, subject to the stated restrictions, many other acids may be used. Such oxidizing acids as nitric acid, chromic acid, or perchloric acid may not be used. When zinc chloride (or other zinc halide) is the only characterising salt present in the solution, acidification may be effected with the hydrogen halides, sulfuric acid, phosphoric acid, acetic acid, formic acid, citric acid, or any other acid forming soluble zinc salts upon reaction with zinc oxide. When the salt solution contains a mixture of zinc halide and a calcium halide, such acids as sulfuric or phosphoric acids cannot be used because they form insoluble calcium salts. Similar criteria are applicable when the zinc halide is used in admixture with other salts.

In the foregoing paragraph, and throughout this specification, wherever mention is made of specific pH values for concentrated zinc chloride solutions, those values are determined in solutions which are prepared by diluting one volume of the concentrated solution with nine volumes of water.

In order to attain truly colorless solutions of the acrylonitrile polymers in zinc halide-containing aqueous media, it is necessary to acidify the salt solution before using it to prepare the polymer solution, as the after-acidification of a discolored polymer solution is not effective in destroying color.

The relationship between color formation and acidity of the saline medium is illustrated in the following Table I. Three different zinc chloride-containing solutions were used. To each of several portions of each solution was added a uniform quantity of monomeric acrylonitrile and an amount of potassium persulfate catalyst equal to 2 percent of the weight of monomer. The noted amount of hydrochloric acid was added and the resulting solutions were held at 30° C. until polymerization was complete (less than 24 hours), and the color of the polymer solution was observed.

Table 1

[A. Salt solution: 34.6 percent zinc chloride; 27.2 percent calcium chloride; 38.8 percent water.]

| HCl required, mols/liter to methyl orange end point | HCl added, mols/liter of saline solution | Excess HCl, mols/liter | Color of polymer solution |
|---|---|---|---|
| 0.213 | None | -------- | Yellow. |
| 0.213 | 0.1206 | -------- | Do. |
| 0.213 | 0.218 | 0.005 | Pale yellow. |
| 0.213 | 0.293 | 0.080 | Colorless. |

[B. Salt solution: 34.6 percent zinc chloride; 21.5 percent magnesium chloride; 43.9 percent water.]

| 0.1024 | 0.1024 | -------- | Pale yellow. |
| 0.1024 | 0.2024 | 0.1 | Colorless. |
| 0.1024 | 0.4024 | 0.3 | Do. |

[C. Salt solution: 60 percent zinc chloride; 40 percent water.]

| 0.21 | None | -------- | Yellow. |
| 0.21 | 0.22 | 0.01 | Colorless. |

The acidification of the saline solution causes a slight reduction in the polymerization rate and a slight diminution in the molecular weight of the polymer obtained, the latter being evidenced by somewhat lower viscosity ratings of solutions of the polymer at standard concentrations. The advantages of the colorless solutions greatly outweigh any disadvantages of lower polymerization rates and lower molecular weights. The discolored solutions obtained when the zinc chloride is not acidified give discolored fibers, while the colorless solutions give white fibers. The extent of the effects of acid on polymerization rates and viscosity is illustrated in Table II. In each case, there was used the same ratio of acrylonitrile monomer by volume to the salt solution. The polymerization was continued for only one hour in each case, and the polymer solution was diluted with more of the same salt solution to 6 percent polymer concentration, for determination of the viscosity. Half of the runs were made without added acid, and the rest were pre-acidified with hydrochloric acid in the amount of 0.01 mol per liter beyond the methyl orange end point.

Table II

| Salt composition | Percent polymerized in 1 hour at 50° C. | | Viscosity of 6% polymer solution, cps. at 50° C. | |
|---|---|---|---|---|
| | (A) No acid added | (B) HCl added | (A) | (B) |
| 50% ZnCl₂, 10% CaCl₂, 40% H₂O | 86.0 | 39.0 | 410 | About 300. |
| 50% ZnCl₂, 10% NaCl, 40% H₂O | 90.5 | 65.5 | 510 | 370. |
| 50% ZnCl₂, 10% MgCl₂, 40% H₂O | 85 | 82.0 | 540 | 320. |
| 60% ZnCl₂, 40% H₂O | 91 | About 85. | 427 | 255. |

The zinc chloride-containing salt solution may be acidified with acids other than hydrochloric acid, as may be seen from the following data. The salt solution employed in each case consisted of 60 percent zinc chloride and 40 percent water. To each 10 parts by volume of this solution was added enough of the acid listed in Table III to reduce the pH to the indicated value. There was then added 2.8 volumes of monomeric acrylonitrile and 1 percent, based on the weight of monomer, of potassium persulfate. Polymerization was effected at 50° C. and the polymer solution was studied to determine the solids content, conversion of monomer to polymer, viscosity, molecular weight of polymer, and color of the solution.

Table III

| Acid added | pH of solution | Percent polymer solids | Percent conversion | Brookfield viscosity, poises at 50° C. | Mol. weight | Color (Gardner color scale) |
|---|---|---|---|---|---|---|
| None | 5.3 | 11.4 | 100 | 119,000 | 167,500 | 5 |
| H₃PO₄ | 4.15 | 10.75 | 94.3 | 145,300 | 179,500 | 1 |
| H₃PO₄ | 2.9 | 11.22 | 98.4 | 81,900 | 124,000 | 0 |
| HCl | 4.0 | 11.44 | 100 | 132,500 | 152,000 | 2 |
| HCl | 2.8 | 11.08 | 97.1 | 48,000 | 107,500 | 0 |
| Formic | 4.0 | 11.2 | 98.3 | 121,000 | 183,000 | 3 |
| Formic | 2.8 | 11.26 | 98.8 | 58,900 | 118,500 | 0 |
| Acetic | 3.95 | 10.97 | 96.2 | 108,200 | 167,000 | 3 |
| Acetic | 3.2 | 11.27 | 98.9 | 65,300 | 122,500 | 2 |
| Chloroacetic | 3.95 | 9.3 | 81.5 | 83,200 | 111,500 | 3 |
| Chloroacetic | 2.8 | 11.22 | 98.4 | 29,400 | 85,000 | 3 |
| Lactic | 3.8 | 11.13 | 97.6 | 117,100 | 154,000 | 1 |
| Lactic | 2.9 | 11.25 | 98.8 | 62,700 | 134,500 | 0 |
| Citric | 4.0 | 10.83 | 95.5 | 134,400 | 177,500 | 1 |
| Citric | 2.8 | 11.19 | 98.2 | 99,800 | 175,000 | 0 |
| Butyric | 3.95 | 11.33 | 99.4 | 118,400 | 171,500 | 3 |
| Butyric | 3.6 | 11.31 | 99.2 | 64,000 | 148,500 | 2 |

When, in a similar manner, a series of tests was made using hydrogen peroxide as the catalyst, the addition of acids to reduce the pH of the zinc chloride to about 4 or lower produced similarly desirable results in preventing discoloration of the polymer solution. Typical results are shown in Table IV, in which the run made at pH 5.3 was catalyzed with potassium persulfate because, at that pH, no polymerization occurs with hydrogen peroxide.

Table IV

| Acid added | pH of solution | Percent polymer solids | Percent conversion | Brookfield viscosity, poises at 50° C. | Mol. weight | Color (Gardner color scale) |
|---|---|---|---|---|---|---|
| None | 5.3 | 11.4 | 100 | | | 5 |
| H₃PO₄ | 4.1 | 9.15 | 80.3 | 67,200 | 224,000 | 0 |
| H₃PO₄ | 2.9 | 9.8 | 86.0 | 72,000 | 158,000 | 0 |
| HCl | 4.0 | 10.9 | 95.6 | 68,800 | 129,000 | 2 |
| HCl | 2.8 | 11.21 | 98.3 | 40,000 | 89,000 | 2 |
| Formic | 4.0 | 10.4 | 91.2 | 36,800 | 115,500 | 2 |
| Formic | 2.8 | 10.84 | 95.1 | 7,040 | 80,000 | 1 |
| Acetic | 3.95 | 9.6 | 84.2 | 6,400 | 76,000 | 2 |
| Acetic | 3.2 | 10.2 | 90.0 | 35,840 | 123,000 | 2 |
| Chloroacetic | 3.95 | 9.86 | 86.4 | 5,120 | 49,000 | 2 |
| Chloroacetic | 2.8 | 10.5 | 92.1 | 9,600 | 71,000 | 2 |
| Lactic | 3.8 | 10.72 | 94.0 | 67,200 | 177,500 | 2 |
| Lactic | 2.9 | 11.14 | 97.7 | 87,360 | 144,000 | 2 |
| Butyric | 3.95 | 11.12 | 97.6 | | | 1 |
| Butyric | 3.6 | 9.09 | 79.7 | 6,400 | 94,000 | 1 |

Note: The Gardner Color Scale is defined by Gardner and Sward, "Physical and Chemical Examination of Paints, Varnishes, Lacquers and Colors," eleventh edition, page 98.

While the oxidizing acids, such as nitric and perchloric acids, exert an adverse effect, and the acids having characteristically colored ions, or yielding such ions upon reaction with zinc oxide, such as chromic and phosphomolybdic acids, cannot be used for obvious reasons, any other acid may be used which does not form insoluble salts with the metal ions in the salt solution to be used as the polymerization medium.

We claim:

1. In a process in which an aqueous zinc halide-containing solution is used as the solvent medium for a linear polymer containing at least 85 percent of acrylonitrile in the polymer molecule, the steps which consist in acidifying said aqueous solution with a water-soluble non-oxidizing acid which forms only colorless and water-soluble salts with the cations present in the solution, the amount of such acid employed being sufficient to reduce the pH of the zinc halide-containing solution to a value lower than that of a solution in water of the zinc halide alone at the same concentration, said reduced pH value not exceeding 4.0, and thereafter dissolving such a polymer in the so-acidified solution.

2. In a process in which an aqueous zinc halide-containing solution is used as the solvent medium for a linear polymer containing at least 85 percent of acrylonitrile in the polymer molecule, the steps which consist in acidifying said aqueous solution with a water-soluble non-oxidizing acid which forms only colorless and water-soluble salts with the cations present in the solution, the amount of such acid employed being sufficient to reduce the pH of the zinc halide-containing solution to a value lower than that of a solution in water of the zinc halide alone at the same concentration, said reduced pH value not exceeding 4.0, and thereafter forming a solution of such a polymer by polymerization of the corresponding monomer in the so-acidified solution.

3. The method claimed in claim 2, wherein there is employed sufficient of the acid to reduce the pH to a value below 4.0.

4. The method claimed in claim 2, wherein the acid employed is hydrochloric acid.

5. The method claimed in claim 2, wherein the acid employed is phosphoric acid.

6. The method claimed in claim 2, wherein the acid employed is formic acid.

7. The method claimed in claim 2, wherein the aqueous solution employed is that of zinc chloride.

8. The method claimed in claim 2, wherein the aqueous solution employed is that of a mixture of zinc and calcium chlorides capable of dissolving polyacrylonitrile.

9. The method claimed in claim 2, wherein the aqueous solution employed is that of a mixture of zinc and magnesium chlorides capable of dissolving polyacrylonitrile.

References Cited in the file of this patent

UNITED STATES PATENTS

| 2,605,246 | Cresswell | July 29, 1952 |
| 2,763,636 | Davis | Sept. 18, 1956 |

FOREIGN PATENTS

| 555,569 | Great Britain | Aug. 30, 1943 |